G. LAVERE.

Improvement in Lamp-Burners.

No. 5,002. Reissued July 23, 1872.

Witnesses

J. H. Shumway

A. J. Tibbitts

Gilbert Lavere
Inventor

By Atty.

Thos. S. Earle

AM. PHOTO-LITHOGRAPHIC CO. N.Y. (OSBORNE'S PROCESS)

UNITED STATES PATENT OFFICE.

GILBERT LAVERE, OF NEW HAVEN, CONNECTICUT.

IMPROVEMENT IN LAMP-BURNERS.

Specification forming part of Letters Patent No. 77,821, dated May 12, 1868; reissue No. 5,002, dated July 23, 1872.

DIVISION A.

*To all whom it may concern:*

Be it known that I, GILBERT LAVERE, of New Haven, in the county of New Haven and State of Connecticut, have invented a new Improvement in Lamp-Burners; and I do hereby declare the following, when taken in connection with the accompanying drawing and the letters of reference marked thereon, to be a full, clear, and exact description of the same, and which said drawing constitutes part of this specification, and represents, in—

Figure 1:
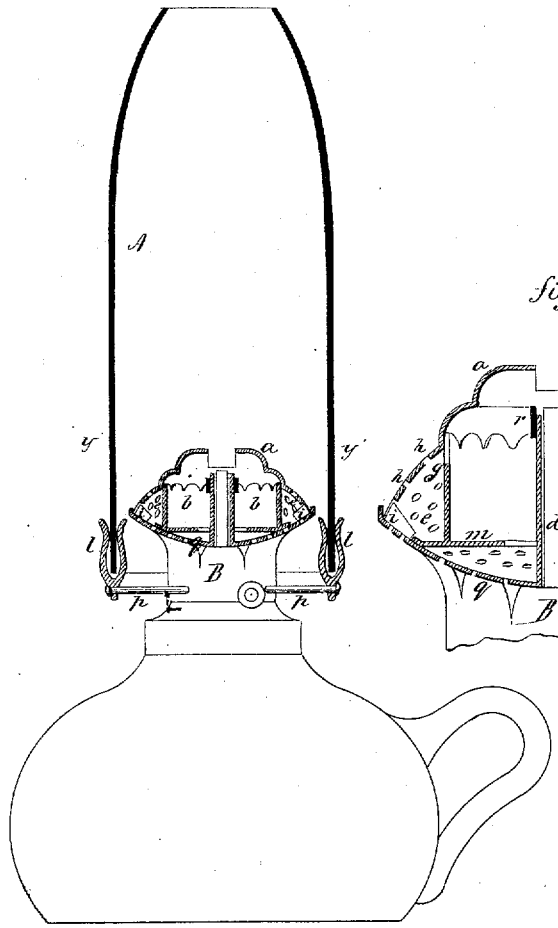
Figure 2:
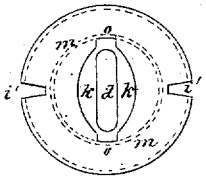
Figure 3:
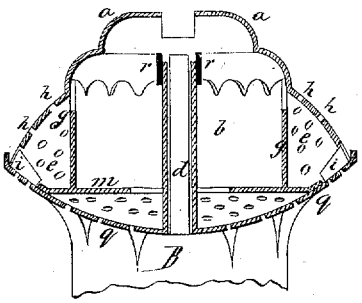

Figure 1, a vertical central section; Fig. 2, a bottom view of the removable chambers; and in Fig. 3, an enlarged view of the section of the burner, as shown at Fig. 1.

This invention consists in the combination of two chambers, forming an essential part of a burner for petroleum-lamps, together with other devices perfecting the whole, as will hereinafter be more fully set forth.

In the drawing, *a* is the cap common to all petroleum-lamps, and the plate forming it also forms the top part of the central chamber *b* (through which the wick-tube *d* passes) and the annular chamber *e*, surrounding the central chamber, as shown. The bottom of the annular chamber is formed by a circular plate, *m*, which projects beyond the said annular chamber and forms a contracted opening, *k*, around the wick-tube *d*. The object of the chamber *e* is to prevent the radiating and conduction of heat laterally against the walls of the chimney A, to which it is contiguous; for the air is permitted to circulate freely through the said chamber *e* by the holes *h h*, &c., as shown. The central chamber supplies air to the flame for combustion, the said air passing into the chamber from below through the contracted gorge or opening *k* around the wick. This gorge *k* is contracted for the purpose of causing currents of air to enter the chamber through the lateral openings *o*, which currents are thereby contiguous to and directly supply the flame at its lateral edges, which the burners as heretofore made fail to do. The cylindrical wall *g*, which divides the interior space of the burner into two chambers, *e* and *b*, as aforesaid, is scalloped or indented along its upper edges, as shown, for the purpose of allowing a free circulation of air into the chamber *e*. The burner, consisting of the cap-plate *a* and the bottom plate *m*, forms one and the same general part, which is removable, for it rests upon the base-plate *q*, attached to and forming part of the neck B, which screws into the top of the lamp in the usual manner. This plate *q* is provided on its upper surface with projections *i* for the purpose of fitting into corresponding recesses *i'* in the edge of the burner, as shown, whereby the latter is held in place, and is at the same time removable for cleaning or other reasons. The said plate *q* is also perforated, as shown, for the purpose of admitting air to the chamber *b*. To insure more complete combustion of the oil a metallic band, generally of brass or copper, fits with easy contact upon the exterior of the wick-tube, as shown at *r*, which is adjusted so as to barely touch the lowest part of the flame. The heat which results from this augmentation of metal at the upper part of the wick-tube conduces to the combustion of the oil by aiding its conversion into gas.

These various devices contribute to produce a burner which accomplishes a more complete combustion of the oil than the burners heretofore used, and, while it furnishes a larger and brighter flame for a given wick-surface, will burn with no diminution of its brilliancy till the whole of the oil is exhausted. It is inexpensive and simple, and not liable to get out of repair.

I claim as my invention—

1. The combination of the central chamber *b* with the annular chamber *e* and wick-tube *d* within the chimney, the said chimney-rest being below the said chamber *b*, substantially as shown and described, and for the purposes set forth.

2. The removable burner, substantially as shown and described, in combination with the rest *q*, the said burner being so constructed as to be lifted off from the said rest *q* without unscrewing, all as set forth.

GILBERT LAVERE.

Witnesses:

J. H. SHUMWAY,

A. J. TIBBITS.